UNITED STATES PATENT OFFICE.

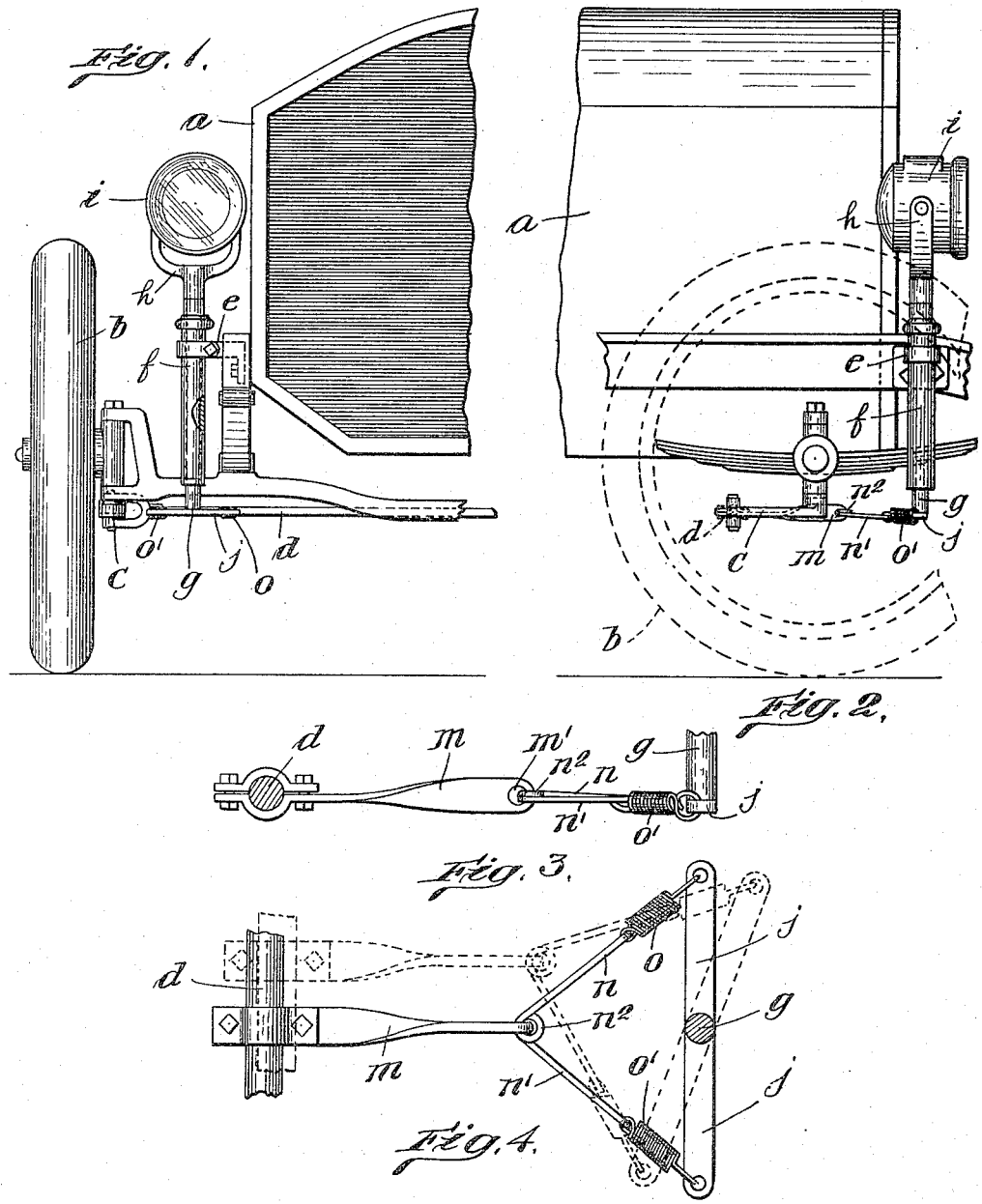

LOUIS E. STEVENS AND ELBRIDGE J. FAIRBROTHER, OF HAVERHILL, MASSACHUSETTS.

AUTOMOBILE-HEADLIGHT ADJUSTER.

1,168,576. Specification of Letters Patent. Patented Jan. 18, 1916.

Application filed January 9, 1915. Serial No. 1,435.

*To all whom it may concern:*

Be it known that we, LOUIS E. STEVENS and ELBRIDGE J. FAIRBROTHER, citizens of the United States, residing at Haverhill, in the county of Essex and State of Massachusetts, have invented an Improvement in Automobile-Headlight Adjusters, of which the following is a specification.

This invention relates to certain improvements in means for automatically controlling the positions of automobile head lights, so that, in passing about a curve, the lights will be turned in advance of the turning of the automobile body.

The objects of our invention are to provide a simple and effective means for automatically controlling the position of the head lights of an automobile, so as to direct the light in the direction in which the front wheels are turned, in advance of the turning of the body, and which is adapted to be readily applied to the common makes of automobiles. We accomplish these objects by the means shown in the accompanying drawing, in which:—

Figure 1 is a front elevation of a portion of an automobile provided with devices embodying our invention. Fig. 2 is a side elevation thereof. Figs. 3 and 4 are detail views of the operating means.

As indicated in the drawings, the automobile body $a$ is supported by springs on the running gear, to which the front wheels, as $b$, are pivoted to swing about a vertical axis, said wheels having rearwardly extending arms, as $c$, which are connected by the link, or operating rod $d$, said rod being moved longitudinally to turn the wheels by the steering-wheel, all in a well-known manner.

According to our invention, we provide a bracket $e$, which is adapted to be supported on the front of the automobile body in any suitable manner, and a bearing tube $f$ is mounted in a vertical position in said bracket. A lamp-supporting shaft $g$ is mounted to rotate in said tube $f$, on suitable bearings at the upper and lower ends thereof, the upper end of the shaft $g$ being provided with forks $h$ in which the head light $i$ is supported.

A cross-bar is mounted in the lower end of the shaft $g$, to provide a pair of arms $j$, which extend at right angles to the shaft at opposite sides thereof. A horizontally disposed bracket $m$ is adjustably secured to the steering rod $d$, by means of a suitable clamp, in a position to extend horizontally toward the lower end of the shaft $g$, and the front end of said bracket is connected to the opposite ends of the arms $j$, by means of a pair of links $n$, $n'$, which consist of a stiff wire bent into a coil $n^2$ in the middle, after its end-portions have been passed in opposite directions through an aperture $m'$, in the end of bracket $m$, of sufficient size to permit the coil to slide easily therein. The ends of the link portions $n$, $n'$, are connected to short coil springs $o$, $o'$, which are, in turn, connected to the end-portion at the arms $j$.

In adjusting the parts of the devices in position for use, the tube $f$ is vertically adjusted in the bracket $e$ to such position that the arms $j$, link $n$, $n'$, and bracket $m$ will normally lie in the same horizontal plane, so that, when the body which carries said bracket $e$, and parts supported thereby, moves up or down, with relation to the front axle, which supports the steering rod $d$, the extent of such movement from such point will be as small as possible, this up-and-down movement being permitted by the springs $o$, $o'$.

In use, when the steering rod $d$ is moved longitudinally to turn the wheels to different angles, the bracket $m$ will be moved laterally, causing one or the other of the links $n$, $n'$ to be pulled so as to swing the arms $j$ and turn the shaft with the head light toward the side to which the front wheels are being swung, thus directing the light therefrom in the direction in which the body of the automobile is to be turned, or is to travel. In thus moving to turn the wheels, the rod $d$ not only moves longitudinally, but also laterally toward the lamp-supporting shaft, so that the extent to which the spring $o$, or $o'$, would be stretched to compensate for the lateral movement of the bracket, as it is carried by rod $d$, is inconsiderable. At the same time, the parts are held in close engagement, so that there is practically no lost motion, or opportunity for the shaft $g$ to sway or swing from positions to which it is positively moved.

With the above-described construction, the extent to which the shaft $g$ will be turned, for a given lateral movement of the bracket arm $m$, will depend on the proximity of the end of said arm to the shaft $g$,

*i. e.*, the shorter the distance therebetween, the greater the movement, and vice versa.

The above-described form of connection between the shaft and the transverse operating link, or rod may be readily applied to any ordinary make of automobile employing a steering gear of the above-described character. It is also of simple and inexpensive construction and unlikely to get out of order.

It will be understood that the above-described arrangement is adapted to be applied to a lamp at each side of the automobile body, the mechanism being merely duplicated in a manner which will be obvious.

We claim:—

1. In combination with the longitudinally movable steering rod of an automobile, a vertically disposed, lamp-supporting shaft mounted independently of said rod, a pair of arms mounted on said shaft and projecting equally therefrom in oppositely disposed positions, a bracket mounted on said rod disposed at approximately the level of the ends of said arms, and a pair of elastic links yieldingly connecting each of said arms and said bracket.

2. In combination with the longitudinally movable steering rod of an automobile, a vertically disposed, lamp-supporting shaft mounted independently of said rod, a pair of arms mounted in said shaft and projecting equally therefrom in oppositely disposed positions, a bracket mounted on said rod and extending into proximity to said shaft to a position normally equidistant from the ends of said arms, and a loop-shaped wire having a coiled middle portion slidably movable in the end of said bracket, and having its legs yieldingly connected to the ends of said arms.

In testimony whereof, we have signed our names to this specification, in the presence of two subscribing witnesses.

LOUIS E. STEVENS.
ELBRIDGE J. FAIRBROTHER.

Witnesses:
L. H. HARRIMAN,
RANSOM C. PINGREE.

Copies of this patent may be obtained for five cents each, by addressing the "Commissioner of Patents, Washington, D. C."